US012507152B2

(12) United States Patent
Van Oost

(10) Patent No.: US 12,507,152 B2
(45) Date of Patent: Dec. 23, 2025

(54) SYSTEM AND METHODS FOR TOPOLOGY-AWARE CONFIGURATION DISTRIBUTION

(71) Applicant: AIRTIES S.A.S., Paris (FR)

(72) Inventor: Koen Van Oost, Istanbul (TR)

(73) Assignee: AIRTIES S.A.S, Paris (FR)

( * ) Notice: Subject to any disclaimer, the term of this patent is extended or adjusted under 35 U.S.C. 154(b) by 519 days.

(21) Appl. No.: 17/919,112

(22) PCT Filed: Apr. 15, 2021

(86) PCT No.: PCT/IB2021/053140
§ 371 (c)(1),
(2) Date: Oct. 14, 2022

(87) PCT Pub. No.: WO2021/209957
PCT Pub. Date: Oct. 21, 2021

(65) Prior Publication Data
US 2023/0164666 A1     May 25, 2023

Related U.S. Application Data

(60) Provisional application No. 63/010,419, filed on Apr. 15, 2020.

(51) Int. Cl.
*H04W 40/24*     (2009.01)
*H04W 12/00*     (2021.01)
*H04W 84/18*     (2009.01)

(52) U.S. Cl.
CPC ....... *H04W 40/248* (2013.01); *H04W 12/009* (2019.01); *H04W 40/246* (2013.01); *H04W 84/18* (2013.01)

(58) Field of Classification Search
CPC ............. H04W 40/248; H04W 12/009; H04W 40/246; H04W 84/18
See application file for complete search history.

(56) References Cited

U.S. PATENT DOCUMENTS

2016/0094398 A1*   3/2016   Choudhury ............. H04L 45/42
                                                                                                       370/254
2017/0272928 A1*   9/2017   Jeng ...................... H04W 8/005

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Hashim S Bhatti
(74) *Attorney, Agent, or Firm* — Volpe Koenig

(57) ABSTRACT

One or more systems, methods, and/or devices for disseminating configuration information in a mesh network. A mesh network may have a plurality of nodes, and each node may belong to a zone depending on each node's number of hops away from a root node of the mesh network. Configuration information may need to be sent to all of the nodes in the mesh network. The configuration information may be sent to the zone of nodes with the greatest number of hops form the root node, and this may be repeated until all of the nodes of the mesh network have been configured.

14 Claims, 4 Drawing Sheets

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

IEEE Standard for a Convergent Digital Home Network for Heterogeneous Technologies, IEEE Std. 1905.1-2013 (Apr. 12, 2013).

* cited by examiner

SYSTEM AND METHODS FOR TOPOLOGY-AWARE CONFIGURATION DISTRIBUTION

CROSS-REFERENCE TO RELATED APPLICATIONS

This application claims the benefit of U.S. Provisional Application No. 63/010,419, filed Apr. 15, 2020, the contents of which are incorporated herein by reference.

BACKGROUND

Issues may arise when configuration information needs to be distributed in a mesh network.

SUMMARY

One or more systems, methods, and/or devices for disseminating configuration information in a mesh network. A mesh network may have a plurality of nodes, and each node may belong to a zone depending on each node's number of hops away from a root node of the mesh network. Configuration information may need to be sent to all of the nodes in the mesh network. The configuration information may be sent to the zone of nodes with the greatest number of hops form the root node, and this may be repeated until all of the nodes of the mesh network have been configured.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
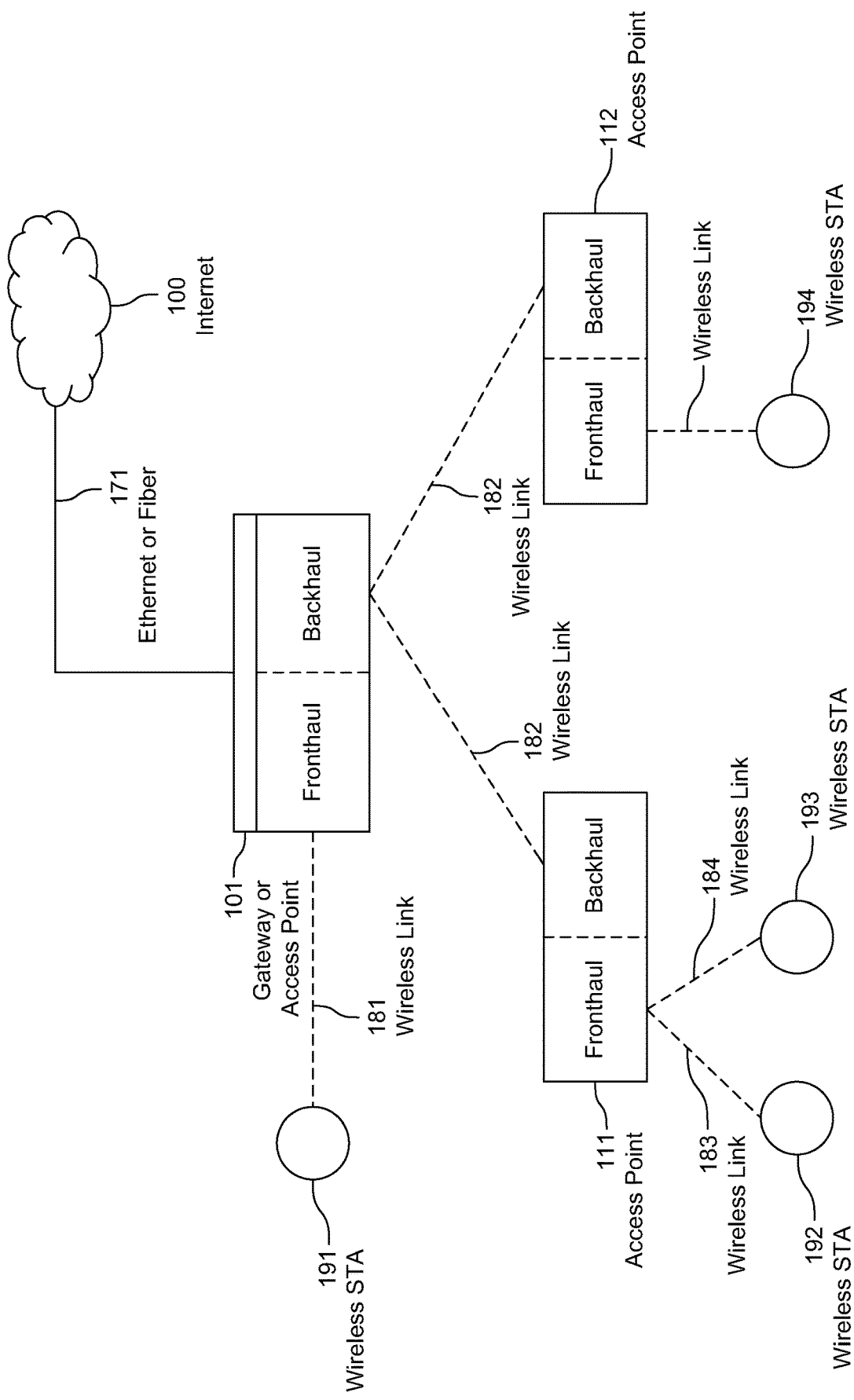
FIG. 1 is a system diagram illustrating an example mesh network in which one or more disclosed embodiments may be implemented.

Systems, devices, and methods for configuration distribution in a communications network are described herein. In one or more embodiments described herein, there may one or more wireless networks with one or more wireless nodes that are used for providing wireless network access (e.g., access to the Internet) for wireless clients (e.g., stations, STAs). While examples and embodiments may describe techniques and approaches from the point of view of a wireless network, the techniques and approaches may also be applicable to any type of communication network (e.g., wired, and/or a hybrid of wired and wireless).

Generally, wireless communication may be used as the last medium for access to a network. For example, in an end user's home network, there may be commercial and/or government communications infrastructure (e.g., fiber lines and/or land lines) that may provide Internet access to the home network, where wireless stations (STAs) may connect to the home network via wireless a wireless interface, such as those of wireless access points (APs). In an example scenario, a Gateway device may serve as the entry point to the outside world (e.g., the communications infrastructure) for the end user terminals (e.g., STAs). A gateway device may be a modem device that is capable of modulating and demodulating signals coming from a land line or fiber optic cables (e.g., hence the name modem) so that the end user can access the Internet. A Gateway device, or an AP, may comprise a plurality of components, such as a processor(s), memory, storage, an Ethernet switch, and/or wireless interfaces (e.g., one or more radio transceivers for Wi-Fi).

In an example network structure, the end users may connect to the Internet via a wireless interface of the Gateway device, where the Gateway device acts as, or comprises, an AP(s). A possible issue of this network structure is the limited wireless coverage of both the Gateway/AP(s) and the end-user terminals. In wireless networks where the entry point to the network is provided by Wi-Fi Gateway/AP(s) (e.g., based on IEEE 802.11 protocols), coverage may be limited due to not only the transmit power limits of the Gateway/AP(s), but also due to the transmit power limits of the end-user terminal (e.g., STAs).

To address this issue, wireless mesh networks may be used because they may provide ubiquitous coverage by comparison. Wireless mesh networks are communication networks that provide wireless interfaces for use by a STA(s), where each node of the wireless mesh network may communicate with one another directly or through other nodes in the network (e.g., wirelessly and/or through a wired backhaul connection). Wireless mesh networks may be made up of at least two nodes. In an example network structure, a wireless mesh network may include a Gateway node and multiple Access Point (AP) nodes. Another installation may include only multiple AP nodes, where one or all of the AP nodes have gateway functionality incorporated. Wireless mesh networks may utilize one communication interface or more than one communication interface, such as Wi-Fi 5 GHz band, Wi-Fi 2.4 GHz band, Ethernet, Power Line Communication (PLC), and/or Multimedia over Coaxial (MoCA). For demonstrative purposes only, some examples of wireless mesh networks are discussed herein with respect to operating wirelessly and providing wireless connectivity; however, note that the approaches and techniques described herein are also applicable to wired/wireless mesh networks that use a combination of wired and wireless connections.

Generally, in one or more embodiments described herein, there may be systems, methods, and/or devices for wireless networks, such as Wi-Fi networks, which are wireless networks that use IEEE 802.11 standards for their Wireless Local Area Network (WLAN) communication. As described herein, Gateway(s) and/or AP(s) that comprise a mesh network may be referred to as nodes. Unless otherwise explicitly specified, a node mean a mesh capable Gateway and/or a mesh capable AP, or more generally a mesh capable network device that provides access for wireless STAs (e.g., wireless clients).

In a Wi-Fi mesh network, wired and wireless clients may access the Internet via the Gateway and/or the APs that make up the mesh Wi-Fi network. FIG. 1 illustrates an example Wi-Fi mesh network that comprises three nodes: a Gateway or AP 101, AP 111, and AP 112. Also in this Wi-Fi mesh network are multiple wireless clients (e.g., wireless STAs 191, 192, 193, and/or 194), which are connected to the Gateway 101 and the APs 111 and 112. Generally, a STA, user terminal, and/or client may be interchangeable, and may be a device with one or more processors, memory, storage, and/or communication interfaces (e.g., one or more radio transceivers for Wi-Fi) (e.g., a STA may be a smart phone, a tablet, a laptop computer, a personal computer, and/or the like). In the example of FIG. 1, the Gateway 101 and APs 111 and 112 may communicate wirelessly with each other, and the Gateway 101 may connect by an ethernet/fiber 171 connection to the internet 100, thereby providing internet access to the nodes and wireless clients of FIG. 1. As depicted in FIG. 1, a node may employ (e.g., operate, communicate on, etc.) a Fronthaul interface to communicate with wireless STAs, and furthermore, a node may employ a Backhaul interface to communicate with other nodes. For example, wireless STA 193 may access the internet by connecting to AP 111 via its Fronthaul, where the AP 111 connects to Gateway 101 via a Backhaul.

Fronthaul and Backhaul interfaces may be virtual (e.g., logical) interfaces. In one scenario, Fronthaul and backhaul interfaces may be linked with the same physical interface (e.g., radio). For example, a 5 GHz radio of a node may employ a Fronthaul interface and a Backhaul interface. In another scenario, a radio may employ one or more Fronthaul interfaces, and/or one or more Backhaul interfaces.

In one scenario, a node may employ separate Fronthaul and Backhaul interfaces that are linked with separate physical interfaces. For example, a node may employ two 5 GHz radios, where one of the radios is dedicated to the Fronthaul interface, and the other radio is dedicated to the Backhaul interface.

In one scenario, a node may employ a single virtual interface, linked with a physical radio interface, to communicate with wireless STAs and other nodes. Each Fronthaul and Backhaul interface may be designated with a MAC address, which may be called Basic Service Set Identifier (BSSID) (e.g., as defined in the IEEE 802.11 standards and/or in accordance with the Wi-Fi Alliance specifications and standards).

The example of FIG. 1 may employ a Fronthaul and Backhaul interface, each having different BSSIDs. A node may communicate directly through its interfaces which have unique BSSIDs. In particular, a node may be reached via a layer-2 (e.g., data-link layer or MAC layer) frame (e.g., message or packet) through the virtual interface using the virtual interface's unique BSSID. In one scenario, a unique BSSID may refer to uniqueness within the node (e.g., among MAC addresses used within one node); or in another scenario, a unique BSSID may refer to uniqueness within the local network (e.g., among MAC addresses used within the local network); or in another scenario, a unique BSSID may refer to uniqueness within the global MAC address space.

Wireless interfaces (e.g., Wi-Fi 2.4 GHz and Wi-Fi 5 GHz interfaces) may need to be configured before they can be used for communication. The configuration may involve setting up the wireless security related credentials, such as but not limited to encryption type, network key, security type, Service Set Identifier (SSID). Some examples of security types used in Wi-Fi networks may include, but are not limited to, Wi-Fi Protected Access (WPA), WPA2, WPA3, WPA Pre-shared Key (WPA-PSK), WPA2-PSK. Some examples of encryption types used in Wi-Fi networks may include, but are not limited to, Advanced Encryption Standard (AES), Temporal Key Integrity Protocol (TKIP). An interface may also be used with open-network credentials meaning that the communication through the interface is not protected by a security method.

For two nodes sharing the same wireless link to communicate, their connected interfaces may be configured with the same credentials so that each node may encode packets to transmit and decode received packets that are sent by the other node on the other end of the link. In a wireless mesh network, all Backhaul interfaces may be configured with the same credentials. Furthermore, in a wireless mesh network, Fronthaul interfaces may be configured with credentials different from the Backhaul interfaces' credentials.

Network credentials may be set by a user through a user interface that may be accessed via a web browser, an application, a computer program running on a mobile terminal, and/or a nomadic or a stationary network device, such as, but not limited to, a smart phone, a tablet, a laptop computer, a personal computer. The user may set credentials on the mobile terminal (e.g., STA) for the Fronthaul interfaces and/or Backhaul interfaces. The user may set the credentials via a cloud controller, a local connection, a remote connection, a service provider, or the like.

In some cases for wireless mesh networks, a user may not need to set the same network credentials for each node, but instead, the user may set the network credential of one node, and then the credentials may be propagated through the nodes so that all nodes are configured with the same credentials. In such a situation, the network credential propagation for wireless mesh networks may be critical, because if the credentials are not, or cannot, be propagated correctly, the nodes may lose connection with each other causing the mesh network to fail and be dysfunctional.

Also for credential propagation, an issue may arise if there is a lack of another safe link (e.g., a link that does not break or disconnect, such as a reliable, robust, or fail-safe link), that can carry the new configuration/credentials among the nodes in the wireless mesh network; accordingly, the configuration of the link may be carried on the same link that will be configured due to a lack of another link (e.g., dedicated or redundant) that may be used to carry the configuration information. This issue may be illustrated by a tree topology, such as the example shown in FIG. 2, where each branch may be a wireless link and each node is an AP. In a tree topology with depth two or more (e.g., as shown there is a depth of three), a configuration may be propagated starting from the deepest leaves (e.g., the node(s) furthest from the root node), and a node may be configured only after all nodes below are configured. Otherwise, the network connection may be lost before all nodes are updated with the same configuration.

Figure 2:
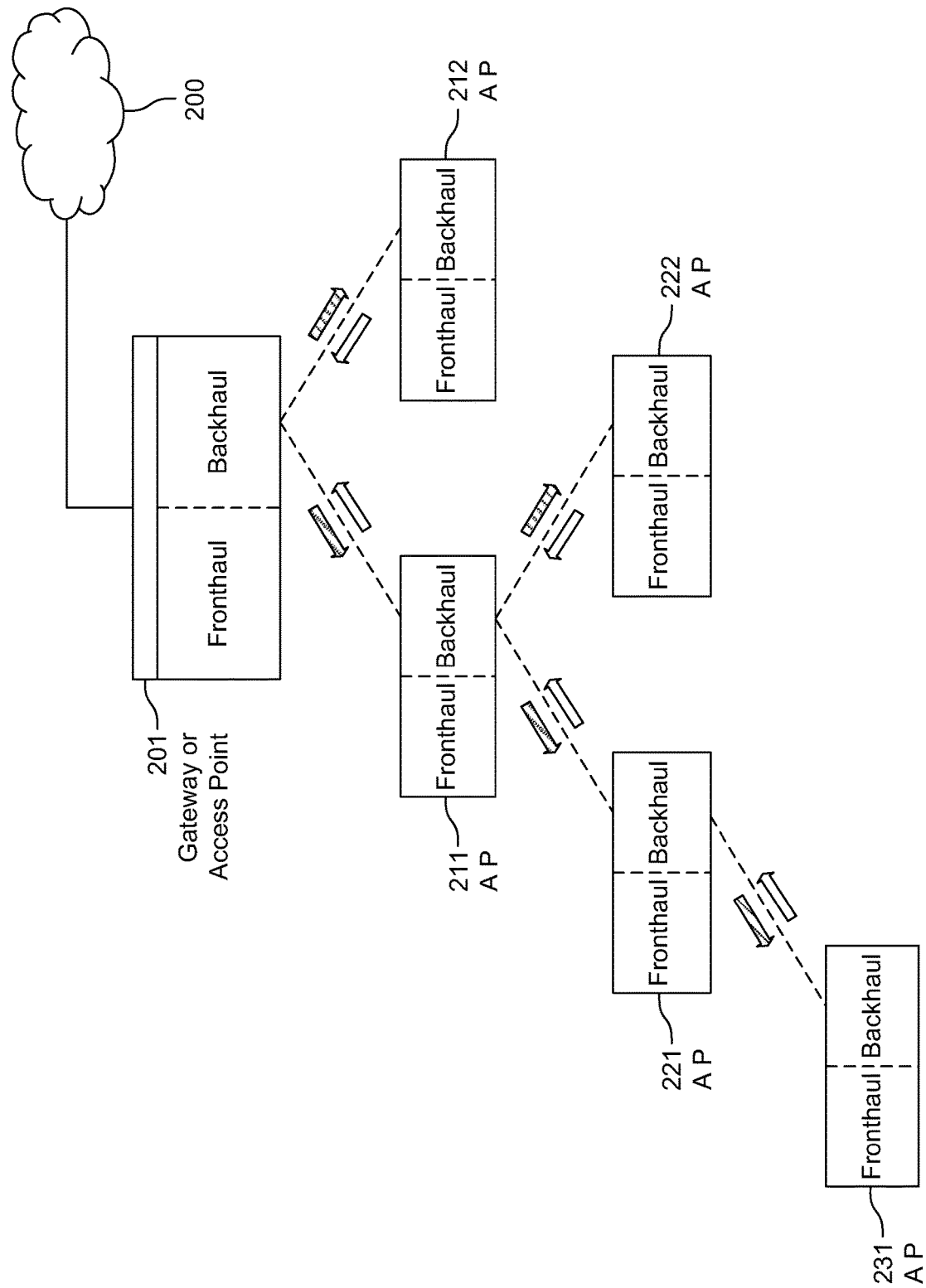
FIG. 2 is an illustration of an example mesh network in a tree topology.

For example, in FIG. 2, the topology of the network is such that there is a root node (e.g., Gateway/AP 201), which connects to two other APs (e.g., AP 211 and AP 212) through a backhaul at a first depth; AP 211, in turn, connects to two other APs (e.g., AP 221 and AP 222) through its backhaul at a second depth (e.g., from the root); and AP 221 connects to AP 231 through a backhaul to a third depth, where the third depth is the farthest from the root node 201. The Gateway/AP 201 may provide access to the internet or some external network (e.g., cloud 200). In FIG. 2, an issue may arise if a configuration begins to propagate somewhere that is not the furthest depth (e.g., AP 231).

This issue may be addressed using a hybrid mesh network structure, where there is a wired and wireless connection, and the wired (e.g., Ethernet, Power Line Communication (PLC), etc.) may be utilized to carry configuration of the wireless interfaces (e.g., since the wired connections due not need configurations to be considered secure in most instances, but the wireless connections require the credentials to be secure). However, if there are no redundant links (e.g., Ethernet links, PLC links, and/or other wireless links formed by separate interfaces), a safe, reliable method may be required for configuration propagation.

In some cases, a mesh network may be set up and managed by a controller running on an node in the mesh network. In one case, the controller may operate on a device outside of the mesh network. Furthermore, each node of the mesh network may be running an agent for responding to queries from the controller or other agents, and applying the commands and configuration settings sent by the controller. In one case, the controller may reside in the Gateway node. The controller may be responsible for the configuration of the nodes in the network. The controller and the agent may comply with, and/or support, Wi-Fi standards (e.g., specifications), such as one or more releases and versions of the Wi-Fi Alliance EasyMesh specifications.

For the purpose of demonstration, and not intending to be limiting, there may be one or more examples and/or techniques disclosed herein for configuration distribution in which a mesh network employs one controller, and each node employs one agent (e.g., as defined in the Wi-Fi Alliance EasyMesh specifications). However, the examples and techniques disclosed herein are intended to be equally applicable to other network structures (e.g., more than one controller, some nodes may not have one agent, some nodes have more than one agent, etc.). As disclosed herein, the term root may be used to designate the root of a tree topology. In one instance, the node where a controller resides/operates may be the root node. In one instance, the controller may reside in the root node, which may also be a Gateway and/or an Access Point. Each node, including the root node, may employ an agent. In one instance, the controller may reside in a node that does not employ an agent. A person skilled in the art would appreciate that the disclosed embodiments are agnostic to whatever specific underlying mesh networking standard may be used in a given mesh network (e.g., IEEE 802.11s, EasyMesh, etc.).

The controller may perform the distribution of configuration information by taking into account the network topology. The controller may receive configuration settings (e.g., network credentials), from a user or from any entity that has the capability to provide configuration settings (e.g., service provider).

The controller may acquire the network topology by making use of topology notification messages sent by the nodes in the mesh network (e.g., the agents that run on/in the nodes). Topology notification messages may include information about any one hop neighbors and link connection status(es) of other node(s). In one case, the controller may make use of topology response messages sent by the nodes (e.g., the agents that run in/on the nodes). A topology response message may be sent by a node in response to a topology query message. Topology notification, topology query and topology response messages may be implemented in accordance with, and/or comply with, one or more standards (e.g., IEEE 1905.1, Wi-Fi Alliance EasyMesh, etc.).

Figure 3:
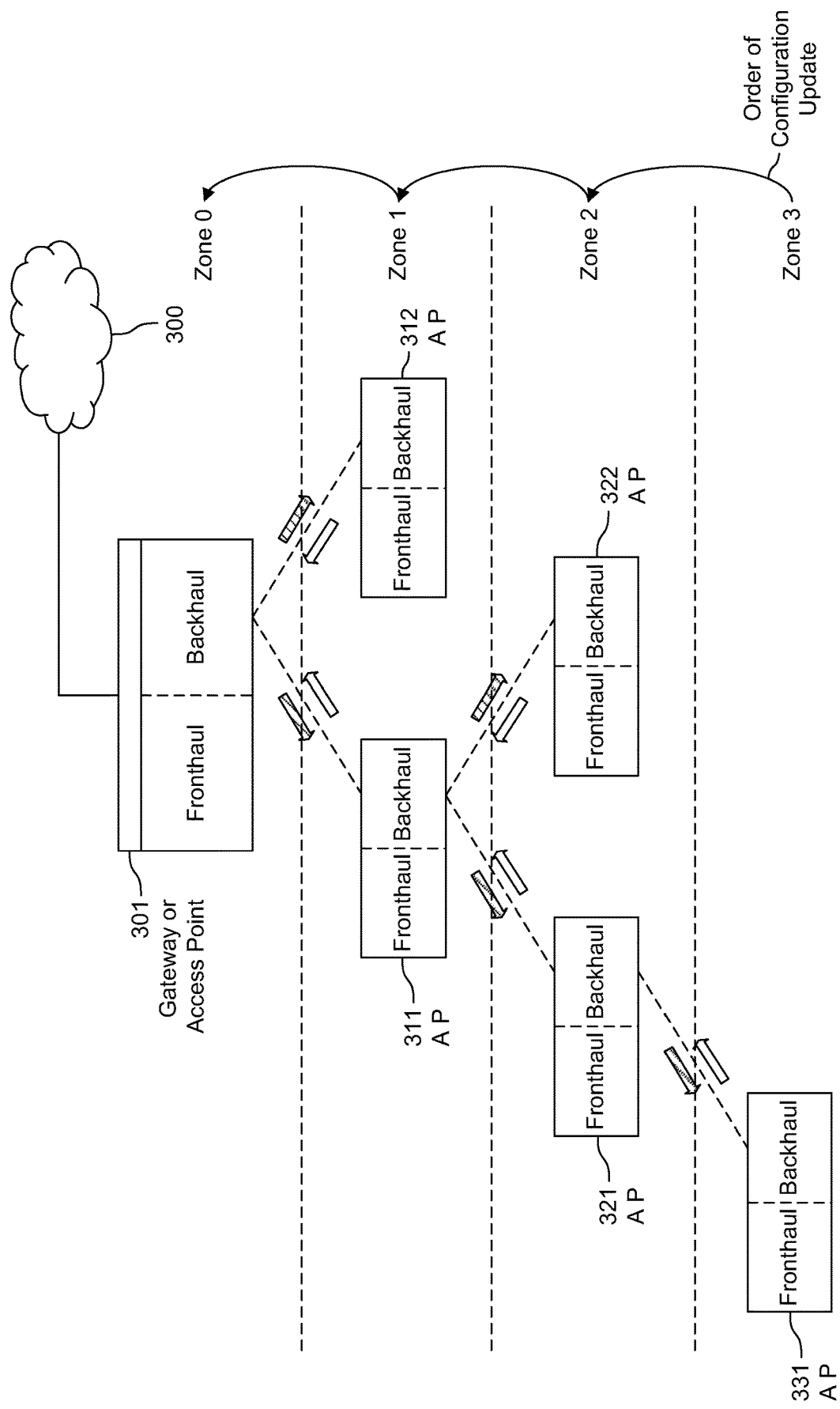
FIG. 3 is an illustration of an example mesh network that has been categorized into zones.

Once the topology of the network is known to the controller, the controller may assign "zones" (e.g., sets of nodes) to the topology based on the distance (e.g., number of hops) from the controller; said another way, the controller may assign each node to a zone (e.g., a set) based on the topology information. Every hop away from the root node counts as "+1." The agent that resides in the root node belongs to Zone 0. Likewise, the controller assigns a zone number to every node (e.g., agent). FIG. 2 and FIG. 3 illustrate example networks with a node three-hops away from a root node. Further, reference to the devices and links in these figures may be similar to those described with relation to FIG. 1.

In FIG. 3, the furthest node (e.g., AP 331) is three hops away from the root node 301, and may be assigned with Zone 3. Further, nodes that are two hops away from the controller 301 maybe assigned with Zone 2 (e.g., AP 321 and AP 322). Further, nodes that are one hop away from the controller 301 may be assigned with Zone 1 (e.g., AP 311 and AP 312). Further, the node where the controller resides in may be assigned with Zone 0 (e.g., Gateway or AP 301).

When the network credentials are to be updated, or initially setup, (e.g., such as at the instruction of a user, manufacturer, service provider, etc.) the controller may send the configuration information to the nodes in a descending order of the zone numbers beginning with the highest numbered zone. Referring to the example of FIG. 3, the controller may first update the configuration of the nodes that belong to Zone 3 (e.g., AP 331). Once the controller confirms that the nodes in Zone 3 have successfully updated their configurations, it may continue with updating the configuration of the nodes in Zone 2 (e.g., AP 321 and AP 322). Likewise, once the controller confirms that the nodes in Zone 2 have successfully updated their configurations, it continues with updating the configuration of the nodes in Zone 1 (e.g., AP 311 and 312). Finally, once the controller confirms that the nodes in Zone 1 have successfully updated their configurations, it continues with updating the configuration of the node in Zone 0 (e.g., the root node, itself, Gateway/AP 301). Upon a given configuration, a STA connected to a node in a zone that is being updated may temporarily by cut off for the duration of the configuration process for the remainder of the zones.

In one case, the controller may use IEEE 1905.1 AP-autoconfiguration Renew messages to inform the agents about the configuration update. IEEE 1905.1 AP-autoconfiguration Renew message may be a relayed-multicast message, so a recipient of the message forwards it to its neighbors. By this way, all agents (e.g., nodes) in the network may be informed about the configuration update.

Each agent may respond with an IEEE 1905.1 AP-Autoconfiguration WSC (M1) message, to the IEEE 1905.1 AP-autoconfiguration Renew message originated by the controller, to receive the updated credentials.

The controller may respond to the IEEE 1905.1 AP-Autoconfiguration WSC (M1) messages in a selective fashion, in that the controller responds to the nodes that belong to the not-yet-updated outermost zone first, where outermost zone is the zone that has the highest number of hops form the root node. The controller may not respond to the M1 messages originating from inner zones until nodes that belong to the outer zones apply the updated configuration. The controller responds to the IEEE 1905.1 AP-Autoconfiguration WSC (M1) message with the IEEE 1905.1 AP-Autoconfiguration WSC (M2) message that includes the updated configuration (e.g., the updated network credentials). The IEEE 1905.1 AP-Autoconfiguration WSC (M2) message may be a unicast message that is addressed to the (e.g., Abstraction Layer MAC address of) agent that resides in the targeted node.

Considering the example of FIG. 3, the controller may first responds to the IEEE 1905.1 AP-Autoconfiguration WSC (M1) messages originating from the nodes in Zone 3 (e.g., AP 331). The controller may not respond to the IEEE 1905.1 AP-Autoconfiguration WSC (M1) messages originating from the other zones until the nodes in Zone 3 have applied the updated configuration. In this way, all nodes request the updated configuration, but the controller responds to them in a selective manner in accordance with their respective zones.

In another case, the controller may make use of a modified IEEE 1905.1 AP-autoconfiguration Renew message to inform only the agents that belong to a specific zone about the configuration update. For that purpose, the controller may include the destination node's address (e.g., the agent's Abstraction Layer MAC address) in the IEEE 1905.1 AP-autoconfiguration Renew message. By this way, only the designated nodes are informed about the configuration update.

Each agent may respond with an IEEE 1905.1 AP-Autoconfiguration WSC (M1) message, in response to the IEEE 1905.1 AP-autoconfiguration Renew message originated by the controller, to receive the updated credentials. The controller may respond to the IEEE 1905.1 AP-Autoconfiguration WSC (M1) message with the IEEE 1905.1 AP-Autoconfiguration WSC (M2) message that includes the updated configuration (e.g., the updated network credentials). In this situation, the controller may trigger the configuration update in a selective manner in accordance with the nodes' zones (e.g., their order in the topology), and may distribute the updated configuration to the nodes from which it receives the M1 messages.

In some cases, the controller may use a configuration update trigger message that may be addressed to a node (e.g., agent's Abstraction Layer MAC address), and the recipient may send the M1 message in response. In one case, the configuration update trigger message may be a IEEE 1905.1 AP-Autoconfiguration Renew message with a unicast receiver address instead of the relayed-multicast receiver address as defined in the IEEE 1901.5 standard. In another case, the controller may use a configuration update trigger message that may be addressed to a group of nodes that reside in a zone.

The controller may use the described configuration distribution method to update configuration of one or more Fronthaul and/or Backhaul interfaces at the same time. For example, in one case, the controller may update the SSIDs, passwords, encryption, and security types of one or more Fronthaul interfaces and one or more Backhaul interfaces at the same time. In another embodiment, the controller may update the SSID, password, encryption, and security types of only one interface (e.g., Fronthaul or Backhaul) among multiple interfaces. The controller may also update only SSID or only password or only encryption type or only security type, or a combination of one or more of these parameters by using the techniques described herein. The techniques described herein may also apply to wireless networks that are composed of nodes that employ one or more radios.

In some cases, the controller may update its view of the network topology via topology notifications sent by the nodes in the network. This way, the controller may have an up-to-date view of the topology. Furthermore, the controller may utilize topology discovery messages, which may be implemented in accord with the IEEE 1905.1 standard, to receive topology response messages from all nodes (agents) in the network.

Figure 4:
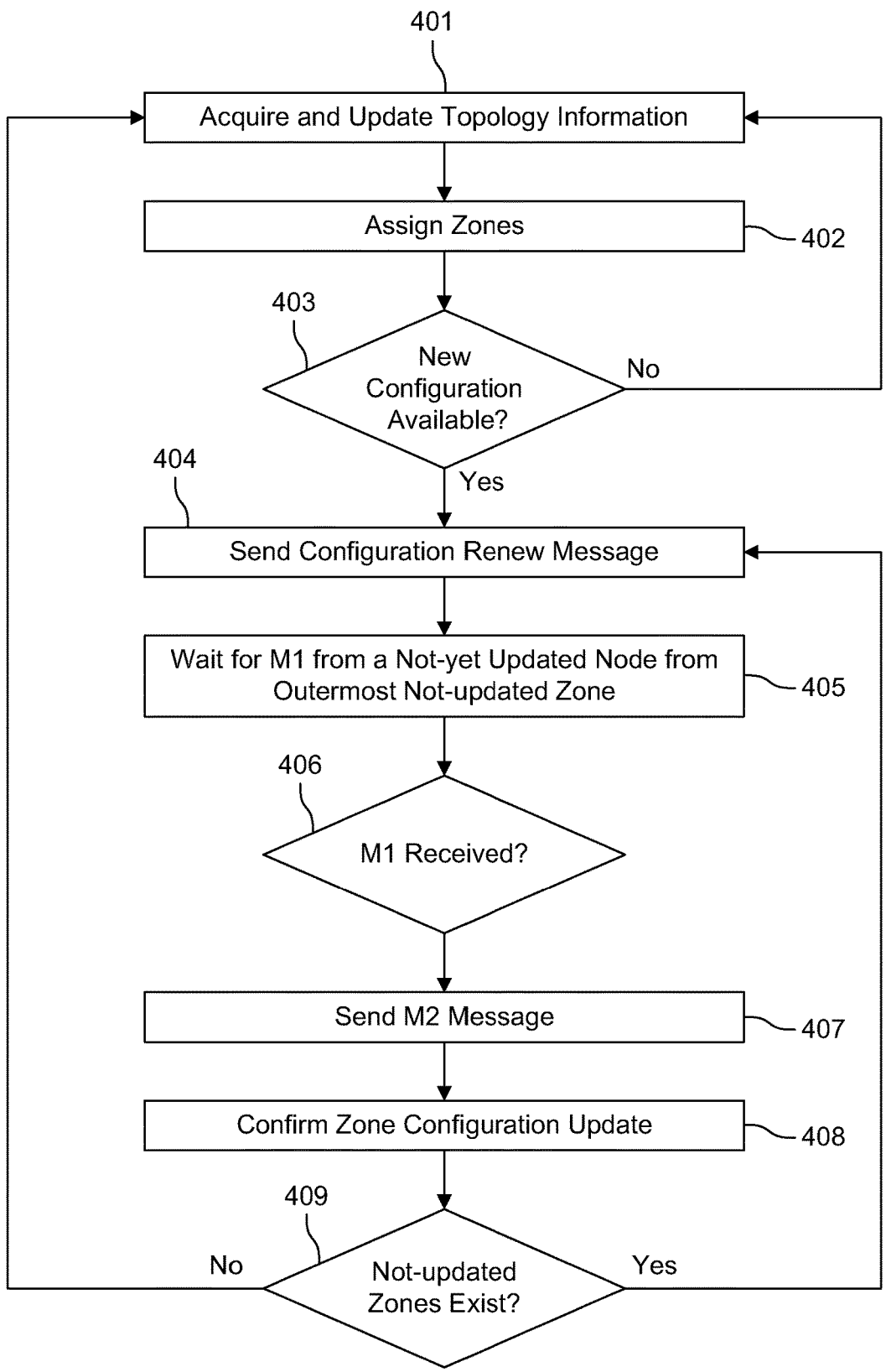
FIG. 4 is an example procedure of updating the configuration of the nodes in a mesh network.

FIG. 4 illustrates an example of the procedure for updating the configuration according to one or more examples/techniques described herein. Generally, the order of the procedure is for demonstrative purposes only, and it is intended that any step can be performed in a different order; further, any step can be optional. At 401, a controller (e.g., operating on/in any node, such as the root node) may acquire and/or update topology information of a mesh network. At 402, the controller my assign zones (e.g., sets) to all of the agents (e.g., nodes) of the mesh network based on the acquired information. At 403, the controller determines whether there is a new configuration available. If not, the process may go back to 401; if yes, at 404, the controller may send a configuration renew message. At 405, the controller may wait for an M1 message from the any agent of at the outermost zone that has not yet been updated in order to send the new configuration information M2 message (e.g., it may need to wait since it may receive other agents M1 messages before it receives the M1 message from the outermost zone of the not-yet updated agent). At 406, the controller receives the M1 message. At 407, if the M1 message has been received, the controller will send the updated/initial configuration information in an M2 message. At 408, the controller may receive a confirmation that the new configuration was successfully applied at the outermost not-yet updated zone. At 409, the controller assesses whether there are any zones left that need to be updated. If there are, then process returns to 404, and proceeds to start the configuration update process for the outermost not-yet updated zone. If there are no more zones left to update, then the controller returns to 401.

In one case, there may be nodes that do not respond to the configuration renew message with the M1 message because they are off, busy, or for some other related reason. In such a case, the repeating of steps 404 may assist in making sure all of the nodes in the mesh network are accounted for, since it provides another opportunity to a node that may have been previously off, to respond with an M1 message. In one case, all nodes may be assumed to be fully operation, and only the example procedure of FIG. 4 may only need to repeat starting at 407, since the controller may assume, or know based on previous response and/or other information, that all M1 messages have been received.

In one example method performed by a controller, the controller may receive topology information from a plurality of nodes of a mesh network. Each node of the plurality of nodes may belong to one set of nodes of a plurality of sets. Each set may represent nodes that are the same number of hops from a root node. The controller may assign each node to a set based on the topology information. The controller may perform an update, where the update may comprise: sending a configuration renew message to the plurality of nodes regarding a new configuration; receiving a message from each node in the plurality of nodes confirming receipt of the configuration renew message; and/or, sending the new configuration to a set of nodes of the plurality of sets that is the greatest number of hops from the root node of the mesh network that has not received the new configuration. The controller may receive a confirmation from each node of a set after the update has been completed. The controller may repeat the update process until of the nodes in a mesh network, and my association, all sets of modes, have the new configuration. The new configuration may comprise a combination of one or more of the following: an SSID, a password, an encryption type, or a security type. The controller may run on any node in the mesh network, such as the root node. The root node may be a gateway device or an access point. The topology information may include the number of hops of a respective node from the root node. Each node may run an agent that handles communication with and instructions from the controller. The controller may analyze the topology information to determine the assignment of the plurality of nodes into the plurality of sets. The controller may periodically check for a new configuration, and may perform this method as necessary. The controller may receive instructions to perform this method.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a, station, access point, a wireless/wired device, or any other computer.

What is claimed:

1. A method performed by a controller, the method comprising:
   receiving topology information from a plurality of nodes of a mesh network, wherein each node of the plurality of nodes belongs to one set of nodes of a plurality of sets, wherein each node of one set is in a zone that is a same number of hops away from a root node, wherein an assignment of the plurality of nodes into the plurality of sets is based on the topology information;
   performing an update, the update comprising:
      sending a configuration renew message to the plurality of nodes regarding a new configuration to be sent after a message is received,
      receiving a message from each node in the plurality of nodes confirming receipt of the configuration renew message, and
      sending the new configuration to a set of nodes of the plurality of nodes that is in a zone that is a greatest number of hops away from the root node of the mesh network that has not received the new configuration, wherein the set of nodes is less than the plurality of nodes; and
   repeating the update for each zone until all of the plurality of sets have received the new configuration.

2. The method of claim 1, wherein the new configuration comprises a combination of one or more of the following: an SSID, a password, an encryption type, or a security type.

3. The method of claim 1, wherein the controller is running on the root node, and wherein the root node is a gateway device or an access point.

4. The method of claim 1, further comprising: receiving a confirmation message that the new configuration was applied successfully.

5. The method of claim 1, wherein the topology information includes a number of hops away from the root node for a respective node.

6. The method of claim 1, further comprising: analyzing the topology information to determine the assignment of the plurality of nodes into the plurality of sets.

7. The method of claim 1, further comprising: repeating the performing the update on a condition that a confirmation message is received from all nodes of a set.

8. A device running the device comprising a processor and a transceiver, wherein:
   the processor and transceiver are configured to receive topology information from a plurality of nodes of a mesh network, wherein each node of the plurality of nodes belongs to one set of nodes of a plurality of sets, wherein each node of one set is in a zone that is a same number of hops away from a root node, wherein an assignment of the plurality of nodes into the plurality of sets is based on the topology information;
   the processor and transceiver are configured to perform an update, the update comprising:
      the processor and transceiver are configured to send a configuration renew message to the plurality of nodes regarding a new configuration to be sent after a message is received,
      the processor and transceiver are configured to receive a message from each node in the plurality of nodes confirming receipt of the configuration renew message, and
      the processor and transceiver are configured to send the new configuration to a set of nodes of the plurality of sets that is in a zone that is a greatest number of hops away from the root node of the mesh network that has not received the new configuration, wherein the set of nodes is less than the plurality of nodes; and
   the processor and transceiver are configured to repeat the update for each zone until all of the plurality of sets have received the new configuration.

9. The device of claim 8, wherein the new configuration comprises a combination of one or more of the following: an SSID, a password, an encryption type, or a security type.

10. The device of claim 8, wherein the device is the root node, and wherein the device is a gateway device or an access point.

11. The device of claim 8, wherein the processor and transceiver are configured to receive a confirmation message that the new configuration was applied successfully.

12. The device of claim 8, wherein the topology information includes a number of hops away from the root node for a respective node.

13. The device of claim 8, wherein the processor and transceiver are configured to analyze the topology information to determine the assignment of the plurality of nodes into the plurality of sets.

14. The device of claim 8, wherein the processor and transceiver are configured to repeat the performing the update on a condition that a confirmation message is received from all nodes of a set.

* * * * *